(12) United States Patent
Deiters et al.

(10) Patent No.: US 12,486,724 B2
(45) Date of Patent: Dec. 2, 2025

(54) INNER BORE COUPLING ASSEMBLY

(71) Applicant: Baker Hughes Oilfield Operations, LLC, Houston, TX (US)

(72) Inventors: Arne Deiters, Celle (DE); Cord Simon Huber, Gehrden (DE)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/813,161

(22) Filed: Aug. 23, 2024

(65) Prior Publication Data
US 2025/0067127 A1 Feb. 27, 2025

Related U.S. Application Data

(60) Provisional application No. 63/578,692, filed on Aug. 25, 2023.

(51) Int. Cl.
  *E21B 17/043* (2006.01)
  *F16L 15/04* (2006.01)
(52) U.S. Cl.
  CPC ............ *E21B 17/043* (2013.01); *F16L 15/04* (2013.01)
(58) Field of Classification Search
  CPC .................................. E21B 17/043; F16L 15/04
  See application file for complete search history.

(56) References Cited

U.S. PATENT DOCUMENTS

| | | | | |
|---|---|---|---|---|
| 439,981 | A * | 11/1890 | Stewart | E21B 17/043 279/100 |
| 776,391 | A * | 11/1904 | Giese | E21B 17/043 403/364 |
| 4,185,856 | A * | 1/1980 | McCaskill | E21B 17/0853 285/391 |
| 6,019,182 | A | 2/2000 | Rountree et al. | |
| 11,519,227 | B2 | 12/2022 | Peters | |
| 12,320,211 | B1 * | 6/2025 | Saltarelli | E21B 17/043 |
| 2011/0147009 | A1 * | 6/2011 | Dupal | E21B 17/043 166/380 |

(Continued)

OTHER PUBLICATIONS

Zhang et al., "Comprehensive review of high frequency torsional oscillations (HFTOs) while drilling", Journal of Petroleum Science and Engineering, vol. 220, Part B, Jan. 2023.

*Primary Examiner* — James G Sayre
(74) *Attorney, Agent, or Firm* — Bracewell LLP; Keith R. Derrington (57) ABSTRACT

A mounting system secures a component in a tubular, which includes a compression element and an annular flow guide. The flow guide is attached to the component by a threaded connection. The compression collar and flow guide have complementary profiles on their respective inner and outer surfaces, which when the compression collar is coaxially urged along the outer surface of the flow guide, the compression collar is radially expanded into compressive engagement with an inner surface of the tubular. A thrust ring threads onto the flow guide, and when rotated, abuts an end of the compression collar to urge the compression collar along the flow guide. The compression collar is rotatable with respect to the flow guide, and includes fingers that register with pockets on an outer housing of the component. Registering the fingers and pockets resists loosening of the threaded connection between the flow guide and component.

20 Claims, 9 Drawing Sheets

(56) References Cited

U.S. PATENT DOCUMENTS

| | | |
|---|---|---|
| 2013/0313022 A1 | 11/2013 | Kirkhope et al. |
| 2014/0050522 A1* | 2/2014 | Slaughter, Jr. .......... E21B 17/03 403/342 |
| 2016/0362943 A1 | 12/2016 | Malstam et al. |
| 2021/0222499 A1 | 7/2021 | Mackay |

* cited by examiner

INNER BORE COUPLING ASSEMBLY

This application claims priority to and the benefit of U.S. Provisional Application Ser. No. 63/578,692, filed Aug. 25, 2023, the entirety of which is incorporated by reference herein in its entirety and for all purposes.

BACKGROUND OF THE INVENTION

1. Field of Invention

The present disclosure relates to an assembly for coupling a device within a bore of a tubular and locking a thread.

2. Description of Prior Art

Many mechanical assemblies incorporate clamping and combined locking, which when subjected to vibrations are vulnerable to damage. These assemblies are found in farming equipment, chemical facilities, compressors, pumps, and any other hardware that experiences repetitive loadings. Clamping and locking devices are also found in drilling systems employed for excavating hydrocarbon producing wellbores in a subterranean formation, and which typically include a drill string made up of a drill pipe string, a drill bit, and a collar connecting the drill bit to the drill pipe string. The drill pipe string is generally made up of joints of drill pipe connected in series by engaging threads on their opposing ends. Usually, the drill string is rotated by a top drive or rotary table provided in a drilling rig on surface while drilling mud is circulated within the drill string to remove cuttings formed by rotating the drill bit in the formation. Often, devices are installed within a drill string for use during drilling, such as mud motors, mud pulsers, turbines, and imaging devices.

Reactive forces from the bit rotating against the subterranean rock formations generate vibrations in the drill string, which are generally most pronounced in the drill pipe string. Depending on the forces and physical characteristics of the drill pipe string and the formation, the vibrations are in directions that are radial, torsional, and combinations. Recent advancements in drilling technology have increased both rates of penetration through the formation and weight on bit, and in turn increased magnitudes of vibrational displacement in drill pipe strings; and sometimes the vibrations reach a level referred to as high frequency torsional oscillations ("HFTO"). These vibrations, especially when reaching HFTO level of vibrations, can dislodge devices that are coupled within drill strings.

SUMMARY OF THE INVENTION

Disclosed herein is an example mounting system to secure a component in a tubular housing, which includes an outer collar having a longitudinal axis and an inner surface, a tubular housing, at least partially inside the outer collar, includes at least one of a pocket and a finger at an axial end of the tubular housing along the longitudinal axis, the component in the tubular housing, the component includes an axial end along the longitudinal axis. The system of this example also includes a stop element, at least partially in the tubular housing and at least partially in the outer collar, the stop element fastened to the tubular housing by a first fastening means, an axial end of the stop element abuts the axial end of the component, the stop element includes a conical surface on an outer surface along the longitudinal axis, a compression element between the stop element and the outer collar, the compression element includes at least one of a finger and a pocket on a first axial end and include a first shoulder on a second axial end along the longitudinal axis and opposite the first axial end, a thrust ring surrounding the stop element and fastened to the stop element by a second fastening means, the thrust ring includes a second shoulder, the second shoulder abutting the first shoulder on the compression element, wherein the compression element applies a coupling force onto the inner surface of the outer collar and (i) the finger on the compression element reaches into the pocket on the tubular housing or (ii) the finger on the tubular housing reaches into the pocket on the compression element, and securing the component axially and rotationally in the outer collar. In an embodiment, the stop element includes an outer diameter, the outer diameter varies along the conical surface and along the longitudinal axis, the conical surface includes a first axial end and a second axial end, and wherein the outer diameter at the first axial end is larger than at the second axial end, and the first axial end is closer to the component than the second axial end. The compression element optionally includes a conical surface on an inner surface along the longitudinal axis, and the conical surface on the compression element corresponds with the conical surface on the stop element. In an alternative, the first fastening means includes first threads on an inner surface of the tubular housing, and second threads on an outer surface of the stop element, and optionally, the second fastening means includes third threads on an outer surface of the stop element and fourth threads on an inner surface of the thrust ring. An inner ring is optionally included that surrounds the thrust ring, the inner ring being surrounded by the compression element and fastened to the thrust ring by a third fastening means, and alternatively the inner ring includes a third shoulder, and the compression element includes a lip, wherein the lip is between the second shoulder and the third shoulder; further optionally, the lip includes an axial extension along the longitudinal axis, and wherein the axial extension of the lip is smaller than the axial distance between the second shoulder and the third shoulder. In an example, the compression element includes one of (i) a compression element surrounding the thrust ring and includes slots extending axially along a portion of the compression element along the longitudinal axis, and (ii) a plurality of separate compression segments located around the thrust ring and wherein each of the plurality of compression segments includes the conical surface. Alternatives exist in which the coupling force exceeds forces from high frequency torsional oscillations that are imparted onto the outer collar. In an embodiment, the stop element includes a central bore with an inner diameter.

Also disclosed is a method of coupling a component within a tubular housing that includes obtaining a stop element comprising a conically profiled outer surface, a portion coupled with the component, the component surrounded by a tubular housing with at least one of a pocket and finger extending along a longitudinal axis of the tubular housing, the stop element coupled with the tubular housing, obtaining a compression element having at least one of a finger and pocket extending along a longitudinal axis of the compression element, disposing the stop element, the tubular housing, and the component inside an outer collar, the outer collar having an inner surface, sliding the compression element into an annular space between the conically profiled outer surface of the stop element and the inner surface of the outer collar, so that the compression element is radially compressed between the stop element and the outer collar and creates a force that axially and rotationally couples the stop element, the tubular housing and the component to the outer collar, and aligning the at least one of the pocket and finger on the tubular housing with the at least one of the finger and pocket on the compression element so that the finger inserts into the pocket as the compression element slides into the annular space. In an example, a conical profile is formed on an inner surface of the compression element that is complementary to and in selective sliding engagement with the conically profiled outer surface on the stop element. In an example, slots are formed axially along a length of the compression element, the slots expanding when the compression element slides over the conically profiled outer surface of the stop element. In an example, the method further includes obtaining a thrust ring having threads on an inner surface, and engaging the threads on the inner surface with threads on an outer surface of the stop element to create a force for sliding the compression element along the stop element. In an example, the method further includes rotating the compression element about the stop element to orient the at least one of the finger and pocket on the compression element with the at least one of the pocket and finger on the tubular housing. In an example, the outer collar includes a section of a drill string and the force that axially and rotationally couples the stop element to the outer collar exceeds forces from high frequency torsional oscillations that are imparted onto the drill string during drilling. In an example, the method further includes coupling a thrust ring to the stop element and using the thrust ring to sliding the compression element into the annular space between the conically profiled outer surface of the stop element and the inner surface of the outer collar, and which optionally further includes coupling an inner ring to the thrust ring, where at least a portion of the compression element is located between the inner ring and the thrust ring and using the inner ring when removing the compression element from the stop element during uncoupling the component and the tubular housing. In an example, the component is a mud motor or a turbine.

BRIEF DESCRIPTION OF DRAWINGS

Some of the features and benefits of the present invention having been stated, others will become apparent as the description proceeds when taken in conjunction with the accompanying drawings, in which.

While subject matter is described in connection with embodiments disclosed herein, it will be understood that the scope of the present disclosure is not limited to any particular embodiment. On the contrary, it is intended to cover all alternatives, modifications, and equivalents thereof.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1A:
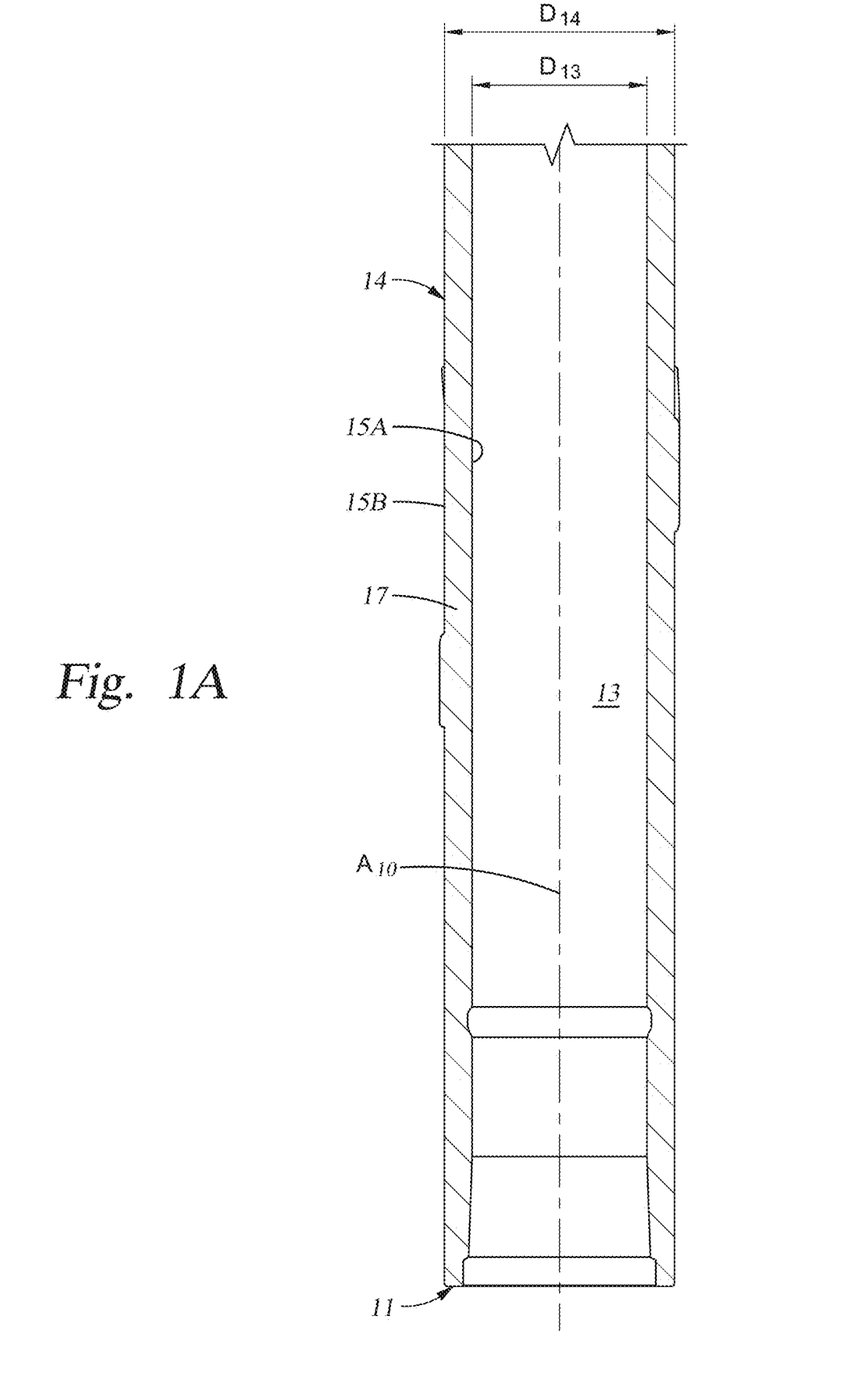
FIGS. 1A and 1B are exploded views of an example of a mounting system for coupling an inner string component within a housing.
Figure 1B:
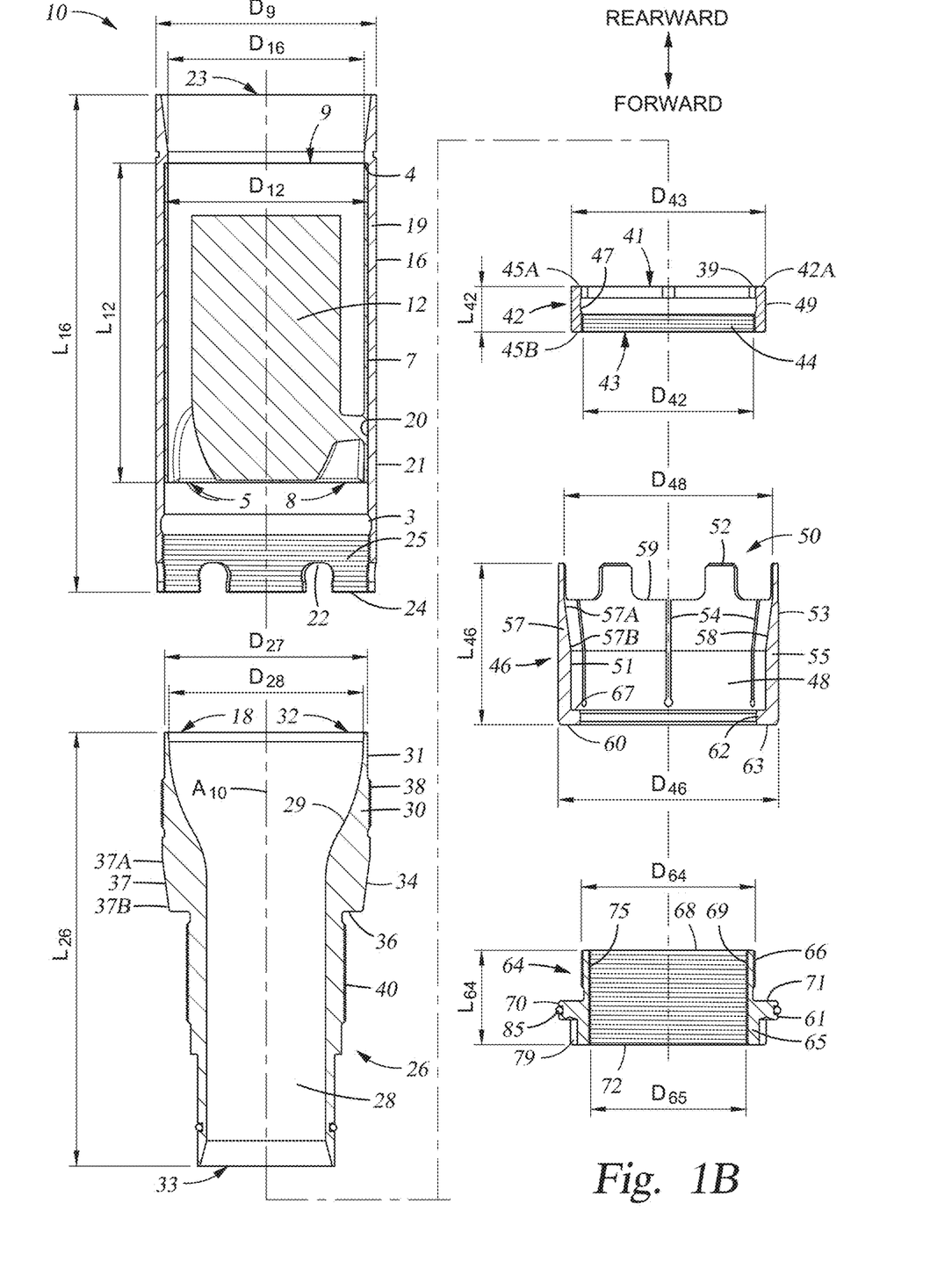

Shown in an exploded view in FIGS. 1A and 1B is an example of a mounting system 10 for securing an inner string component 12 within a bore 13 of an outer member 14, which has a rearward end (not shown) and a forward end 11. Outer member 14 of FIG. 1A is elongated, and has a bore 13, an inner surface 15A, an inner diameter $D_{13}$, an outer surface 15B, an outer diameter D14 and a sidewall 17. For the purposes of discussion herein, outer member 14 is also referred to as an outer collar. Inner diameter $D_{13}$ is dimensioned to accommodate a flow of fluid (not shown) and with component 12 in a path of and in contact with the flow of fluid. Outer surface 15B of outer member 14 is optionally exposed to the environment ambient to outer member 14, such as drilling mud and/or a rock formation in a wellbore. The outer member 14 optionally is a tool collar of a bottom hole assembly (BHA). The tool collar optionally has an outer diameter of 4¾ inches or 6¾ inches, or any other typical BHA diameter. Further examples of the outer member 14 include a drill string, a caisson, and a fluid flow line; and examples of the inner string component 12 include one or more of a turbine, a generator, an electrical motor, a mud motor, a pulsing system, a formation evaluation sensor, an imaging tool, any other device disposed within a bore of a drill string. The outer member 14 in a BHA alternatively connects to other BHA components, such as other tool collars or the drill bit. The outer member 14 is optionally made from metal, such as steel, or Inconel®. String component 12 of FIG. 1B has an outer diameter $D_{12}$, an outer surface 7, a forward end 8, a string component rearward end 9, and a length $L_{12}$. Component 12 is optionally referred to herein as string component or inner string component. In the illustrated example, string component 12 is secured within a component housing 16 (e.g., a tubular housing). As shown, component housing 16 has a component housing rearward end 23, a forward end 24, an outer diameter $D_9$, an inner diameter $D_{16}$, an inner surface 20, an outer surface 21, and a length $L_{16}$. Outer diameter $D_{12}$ of string component 12 corresponds to inner diameter $D_{16}$ of component housing 16 considering a clearance of a few $10^{th}$ of a millimeter for easy shifting of the string component 12 into component housing 16. Pockets 22 are on the forward end 24 of component housing 16; as shown, pockets 22 are semi-circularly shaped openings that extend radially through sidewalls 19 of the component housing 16 and project longitudinally away from the rearward end 23. Pockets 22 form a part of a toothing connection and are optionally squared, triangled, frusto-conical, or any other shape suitable for toothlike or castellated coupling. Rearward corners of the pockets 22 are optionally rounded to reduce the likelihood of cracking under mechanical stress. Forward corners of pockets 22 are optionally rounded to allow smoother make-up of the toothing connection and allow a counterpart of the toothing connection to enter the pockets 22 easier. Threads 25 are shown formed along the inner surface 20 of housing 16 and just rearward of pockets 22 and or coinciding with pockets 22. In an alternative embodiment the pockets 22 extend partially through the sidewalls 19 of component housing 16 in a radial direction forming an indentation in the inner surface 20 or outer surface 21 of the component housing 16. In one more alternative embodiment the component housing 16 includes one pocket. The string component 12 is optionally made from metal, such a steel or cast iron or plastic (such as PEEK). The component housing is optionally made from metal, such as steel. In examples, the outer diameter $D_9$ of component housing 16 ranges from about 80 mm to 150 mm, and the thickness of sidewall 19 ranges from about 3 mm to about 5 mm.

Mounting system 10 includes an annular flow guide 26 having a bore 28 (which optionally is made up of several bores or other shaped flow channels) formed along a longitudinal axis $A_{10}$ of mounting system 10. For the purposes of discussion with regard to FIG. 1B, flow guide 26 is in a location that is forward of component 12. An inner surface 29 and outer surface 31 of flow guide 26 are profiled along longitudinal axis $A_{10}$ so that an outer diameter $D_{27}$ of flow guide 26 and a diameter $D_{28}$ of bore 28 (inner diameter of flow guide 26) each change along a length of the flow guide 26, so that sidewalls 30 of flow guide 26 have a varying radial thickness along flow guide 26 and with respect to longitudinal axis $A_{10}$. A rearward end 32 of flow guide 26 is shown proximate inner string component 12. The rearward end 32 includes an annular shoulder 18. Optionally, the inner diameter $D_{28}$ is larger at the rearward end 32 of flow guide 26 than the inner diameter $D_{28}$ at a forward end 33 of flow guide 26 leading to a decreasing inner diameter $D_{28}$ from the rearward end 32 to the forward end 33 of flow guide 26 along the longitudinal axis $A_{10}$. The outer diameter $D_{27}$ of flow guide 26 at the rearward end 32 corresponds to inner diameter $D_{16}$ of component housing 16 considering a clearance of a few $10^{th}$ of a millimeter for easier shifting of the flow guide 26 into component housing 16. The outer diameter $D_{27}$ of a portion of flow guide 26 proximate rearward end 32 reduces with distance away from rearward end 32 and forms a frusto-conical portion 37 that extends along the longitudinal axis $A_{10}$. In the frusto-conical portion 37 the outer surface is formed frusto-conical and provides a frusto-conical surface 34. The outer diameter $D_{27}$ of a rearward end 37A of frusto-conical portion 37 that is closer to the rearward end 32 than to the forward end 33 is larger than the outer diameter $D_{27}$ of a forward end 37B of frusto-conical portion 37 that is closer to the forward end 33 than to the rearward end 32 of flow guide 26. The outer diameter of flow guide 26 transitions radially inward to define an annular shoulder 36 that faces away from rearward end 32. Shoulder 36 is proximate to a terminal end (forward end 37B) of frusto-conical surface 34 that is distal from rearward end 32 of flow guide 26. Threads 38 are formed on an outer surface 31 of sidewalls 30 along a portion of flow guide 26 between frusto-conical portion 37 and rearward end 32. Threads 40 are also formed on the outer surface 31 of sidewalls 30 on a portion of flow guide 26 forward of shoulder 36 and forward of the frusto-conical portion 37 of flow guide 26. The outer diameter of threads 38 is larger than the outer diameter of threads 40. The flow guide 26 has a length $L_{26}$. In an alternative embodiment, the inner surface 29 of the flow guide 26 is not profiled and the inner diameter $D_{28}$ is constant along the longitudinal axis $A_{10}$. Frusto-conical portion 37 is optionally angled from about between 5° to about 10° to the longitudinal axis $A_{10}$. Flow guide 26 is optionally made from metal, such as steel. Examples of length $L_{26}$ range between about 50 mm to about 300 mm, and include greater or lesser values depending on the overall dimension of the mounting system 10. Frusto-conical may also referred to herein as conical.

An inner ring 42 is included with system 10 which is illustrated as an annular member having an axial length $L_{26}$ less than flow guide 26, a rearward end 41 and a forward end 43. The rearward end 41 of inner ring 42 is closer to the component housing 16 than the forward end 43 of inner ring 42. Threads 44 are formed along an inner surface 47 of inner ring 42. A rearward annular shoulder 45A is shown on the rearward end 41 and a forward annular shoulder 45B is shown on the forward end 43. The rearward end 41 includes a lip 42A. The rearward shoulder 45A faces towards the component housing 16 and forward shoulder 45B faces away from component housing 16. Inner ring 42 has an outer diameter $D_{43}$ defining an outer surface 49 and an inner diameter $D_{42}$. Inner ring 42 optionally includes a profile 39 configured to receive an assembly tool, such as a wrench to mount inner ring 42 onto a neighboring part (such as thrust ring 64). Shown spaced forward of inner ring 42 is an annular compression collar 46, which is also included with system 10. The compression collar is also referred to herein as compression element. Compression collar 46 includes a bore 48 defining an inner surface 51 and extending along longitudinal axis $A_{10}$ and a rearward end 50. A sidewall 55 of compression collar defines and outer surface 53 with an outer diameter $D_{46}$. Fingers 52 are shown along an outer periphery of rearward end 50 circumscribing longitudinal axis $A_{10}$ and projecting axially towards flow guide 26 and component housing 16, alternatives exist in which fingers 52 are generally oblique with longitudinal axis $A_{10}$. The fingers 52 are configured to be received within the pockets 22 of component housing 16. The sidewalls 55 of the compression collar 46 include elongated slots 54 that extend from the rearward end 50 and terminate at a point 56 along the length $L_{46}$ of the compression collar 46. The slots 54 extend through sidewall 55 from the inner surface 51 to the outer surface 53 of the compressing collar 46. Ends of slots 54 distal from rearward end 50 optionally have a curved outer periphery to avoid material cracking. Inner diameter $D_{48}$ decreases from the rearward end 50 of compression collar 46 to a forward end 60 so that the inner diameter $D_{48}$ of the compression collar 46 is larger at the rearward end 50 than at the forward end 60. Diameter $D_{48}$ of bore 48 reduces with distance away from rearward end 50 along a portion of the length of compression collar 46, to define a frusto-conical surface 58 on the inner surface 51 of compression collar 46. A frusto-conical portion 57 of compression collar 46 has a rearward end 57A and a forward end 57B. The inner diameter $D_{48}$ of the rearward end 57A of frusto-conical portion 57 that is closer to the rearward end 50 than to the forward end 60 is larger than the inner diameter $D_{48}$ of a forward end 57B of frusto-conical portion 57 that is closer to the forward end 60 than to the rearward end 50 of compression collar 46. In an alternative, surface 58 is complementary to surface 34 and extends from a base 59 of the fingers 52 to about midway between base 59 and the forward end 60 of the compression collar 46. Surface 58 being complementary to surface 34 includes that surface 58 and portion 57 on compression collar 46 correspond to surface 34 and portion 37 on flow guide 26, respectively, and the angle of frusto-conical portion 37 and the angle of frusto-conical portion 57 substantially are the same angle to the longitudinal axis $A_{10}$. A lip 62 is shown on the forward end 60 of compression collar 46 where the sidewalls project radially inward and abruptly reduce diameter $D_{48}$ to form a first annular shoulder 63 on the outer surface 53 and on the forward end 60 of the compression collar 46. Shoulder 63 projects away from the rearward end 50. Lip 62 forms a second annular shoulder 67 on the inner surface 51. The second shoulder 67 projects away from the forward end 60 of compression collar 46 and projects towards rearward end 50. The inner diameter $D_{48}$ between forward end 57B of frusto-conical section 57 and lip 62 is larger than outer diameter $D_{43}$ of inner ring 42 (such as a few $10^{th}$ of a millimeter). Pockets 22 and fingers 52 can optionally be reversed between both compression collar 46 and component housing 16. That is, the fingers 52 are included in the component housing 16 at the forward end 24 of component housing 16 and the pockets 22 are included in the compression collar 46 at the rearward end 50. Optionally both parts, the compression collar and the component housing, include fingers 52 and pockets 22. In examples, the fingers 52 have an axial length that correspond with an axial length of the pockets 22, the maximum length of the fingers 52 equals the axial length of the pockets 22, the minimum axial length of the fingers 52 provides sufficient axial overlap of fingers and pockets to block relative rotation of compression collar 46 to component housing 16. In this example, the overlap is the axial distance the fingers 52 that reach into the pockets 22. An example of a sufficient axial overlap blocks relative rotation, and ranges from about 5 mm to about 10 mm, or from about 10 mm to about 20 mm, or from about 20 mm to about 50 mm. In an alternative embodiment a plurality of separate compression segments (not shown) are optionally used instead of the compression collar 46. The compressions segments each surround a portion of a circumference of the flow guide 26. Each of the compression segments include a frusto-conical surface on an inner surface. The compression collar or the compression segments are optionally made from metal, such as bronze or brass to avoid fretting with neighboring parts, such as the outer member 14 and the flow guide 26.

Still referring to FIG. 1B, mounting system 10 further includes a thrust ring 64 shown spaced forward of compression collar 46. Thrust ring 64 is shown as an annular member with sidewalls 65 that have a radial thickness that varies along longitudinal axis $A_{10}$. Threads 66 are shown formed on a portion of an outer surface 61 of thrust ring 64 adjacent a rearward end 68 of thrust ring 64. Threads 69 are also formed along a portion of an inner surface 75 of the sidewalls 65 of thrust ring 64. Threads 69 are optionally formed at any position between the rearward end 68 and a forward end 72 of thrust ring 64, such as proximate the rearward end 68 or proximate to the forward end 72 or proximate the mid position between rearward end 68 and the forward end 72. An outer diameter $D_{64}$ of thrust ring 64 projects radially outward to define a ridge 70. Threads 66 optionally extend between the ridge 70 and the rearward end 68 of thrust ring 64. An annular shoulder 71 is formed on a side of ridge 70 shown facing rearward end 68. In the example shown ridge 70 is closer to forward end 72 than to rearward end 68. Optionally, ridge 70 is closer to rearward end 68 than to forward end 72, or a distance of ridge 70 to rearward end 68 is the same as the distance to forward end 72. As shown, an inner diameter $D_{65}$ of the thrust ring 64 is substantially constant along the length of the thrust ring. In the example of FIG. 1B, the length $L_{64}$ of the thrust ring 64 is shorter than the length $L_{16}$ of the component housing 16 and shorter than the length $L_{26}$ of the flow guide 26. The length of the thrust ring 64 can optionally be shorter or longer than the length $L_{46}$ of the compression collar 46. Thrust ring 46 optionally includes a seal 85 to keep dirt away from the wedging contact between compression collar 46 and outer member and an annular space 77 between the outer surface 53 of the compression collar 46 and the inner surface 15A of the outer member 14. Thrust ring 64 is optionally made from metal, such as steel.

Figure 2A:
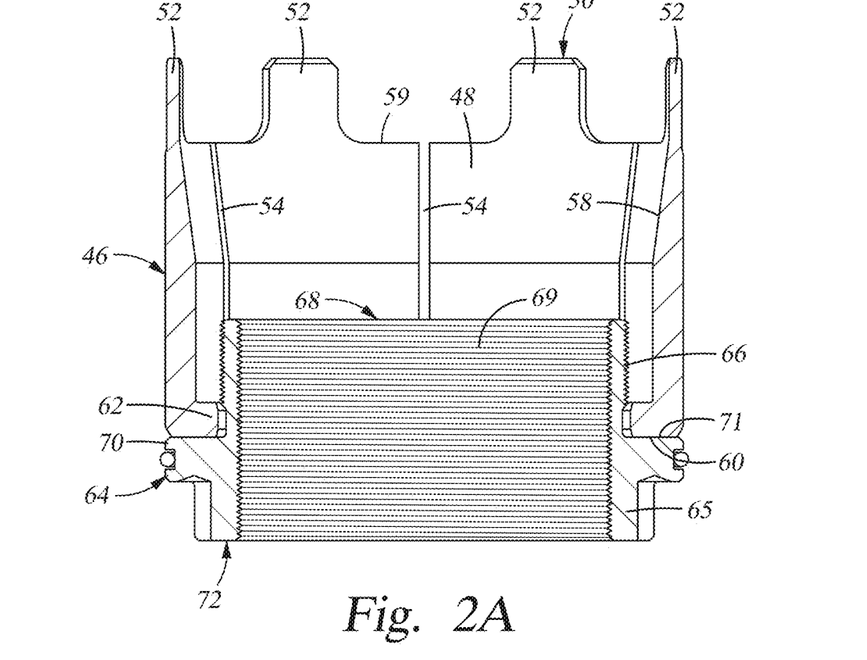
FIGS. 2A-2D are sectional views of an example of stages of assembly of the mounting system of FIGS. 1A and 1B.
Figure 2B:
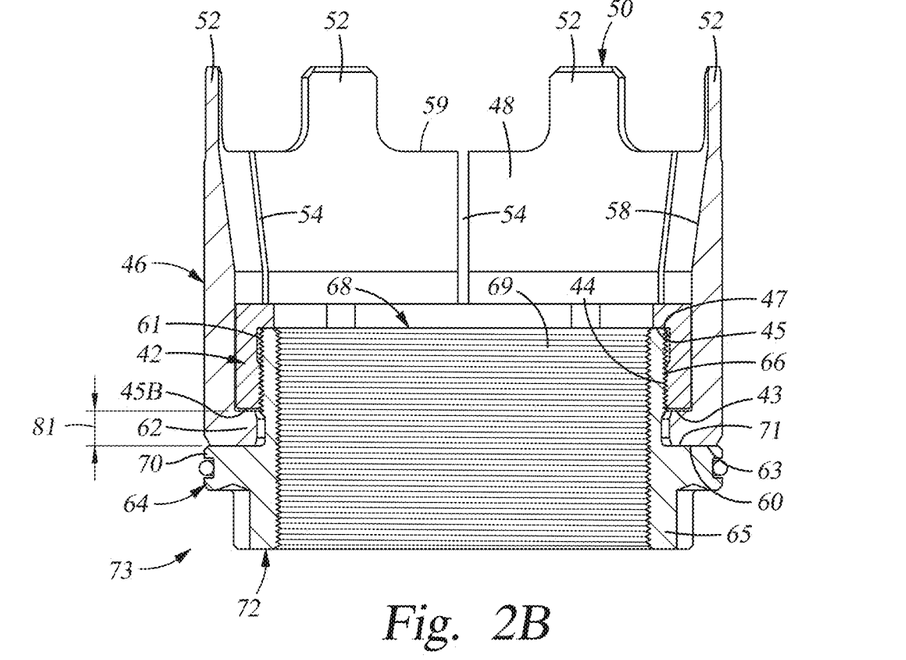

An example of assembling the mounting system 10 of FIGS. 1A and 1B is shown in a side-sectional view FIGS. 2A and 2B. Illustrated in FIG. 2A is the rearward end 68 of the thrust ring 64 inserted into the forward end 60 of compression collar 46 and with rearward end 68 extending into bore 48 of compression collar 46. Lip 62 of the compression collar 46 is shown circumscribing sidewalls 65 of the thrust ring 64 and the first shoulder 63 of compression collar 46 is adjacent to and/or in abutting contact with shoulder 71 on ridge 70. Next in this example, and shown in FIG. 2B, inner ring 42 is inserted into bore 48 of compression collar 46 through the rearward end 50, and threads 44 on the inner surface 47 of the inner ring 42 are engaged with threads 66 on the outer surface 61 of the thrust ring 64 until an annular shoulder on the lip 42A and on the inner surface 47 of the inner ring 42 abuts rearward end 68 of thrust ring 64. Inner ring 42, when connected to thrust ring 64, secures compression collar 46 in an axial position relative to thrust ring 64 and inner ring 42 by limiting the axial movement of compression collar 46 relative to thrust ring 64 and inner ring 42. By connecting the inner ring 42 to the thrust ring 64, the compression collar 46 is limited to the axial position between the shoulder 45B on the inner ring 42 and the shoulder 71 on the thrust ring 64. In the example shown, the axial distance between the forward end 43 (shoulder 45B) of inner ring 42 and the shoulder 71 exceeds an axial width of lip 62 allowing the compression collar 46 to be rotated about longitudinal axis $A_{10}$ while the inner ring 42 is threadingly engaged with the thrust ring 64. When inner ring 42 is fully engaged with thrust ring 64, there exists a gap 81 between shoulder 45B and shoulder 71. The axial width of the gap 81 exceeds the axial width of lip 62, which in examples ranges from around 0.1 mm to around 1.0 mm. There is a clearance between shoulder 45B of inner ring 42 and second shoulder 67 of compression collar 46. Alternatively, there is a clearance between first shoulder 63 of compression collar 46 and shoulder 71 of thrust ring 64 as long as the frusto-conical surface 58 on the compression collar 46 is not engaged with frusto-conical surface 34 on the flow guide 26. A combination of the rings 42, 64 and the freely rotating compression collar 46 that is axially retained within the rings 42, 64 is referred to as a cam assembly 73. In different embodiments of the cam assembly 73 compression collar 46 is rotatable. To allow rotation of compression collar 46 about longitudinal axis $A_{10}$ when inner ring 42 is threadingly engaged with thrust ring 64, the outer diameter $D_{43}$ of inner ring is smaller than inner diameter $D_{48}$ of compression collar 46 to allow the compression collar 46 to rotate independently of inner ring 42. Example values of clearance between inner diameter $D_{48}$ and outer diameter $D_{43}$ range from around 0.1 mm to around 1.0 mm. The inner ring 42 is optionally made from metal such as brass or steel. During assembly of the mounting system 10 the compression collar 46 is pushed along the longitudinal axis $A_{10}$, shifting the frusto-conical portion 57 of the compression collar 46 up the frusto-conical portion 37 of the flow guide 26. The compression collar 46 expends in radial direction, perpendicular to longitudinal axis $A_{10}$ and wedges between outer member 14 and flow guide 26. The inner ring 42 provides for a means to pull, or to remove, the compression collar 46 from the flow guide 26 during disassembly of the mounting system 10 or during separation of the carn assembly 73 from the flow guide 26. To release compression collar 46 from the wedged position a pulling force toward the forward direction is required. Unthreading thrust ring 64 from flow guide 26 makes the second shoulder 67 of compression collar 46 to get into abutting contact with shoulder 45B on forward end 43 of inner ring. Further unthreading of thrust ring 64 causes inner ring 42 to push compression collar 46 into the forward direction and away from the frusto-conical portion 37 of flow guide 26 to pull compression collar from the wedged position. Without inner ring 42 the compression collar 46 would remain in the wedged position when thrust ring 64 is unthreaded from flow guide 26.

Figure 2C:
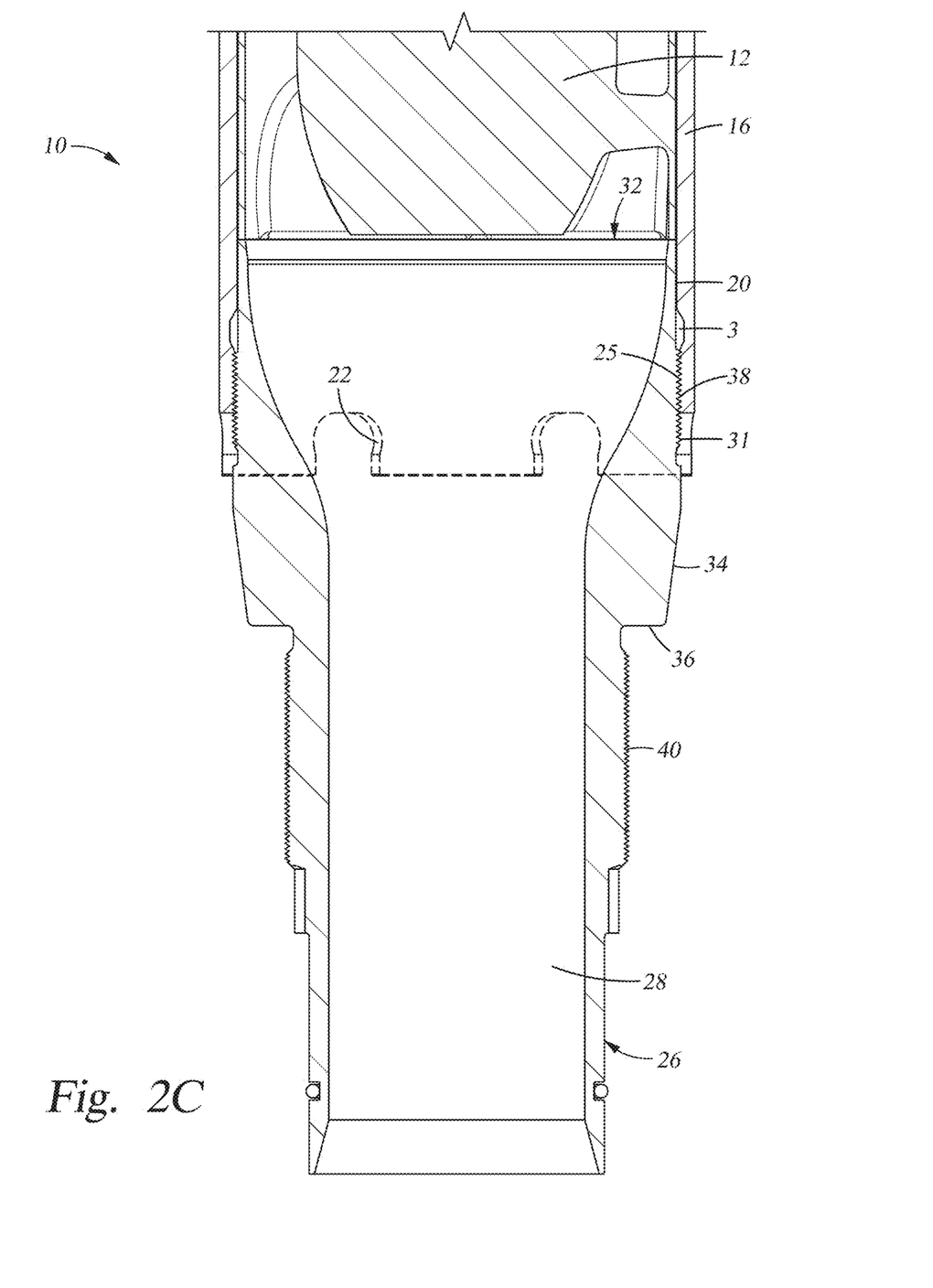
Figure 2D:
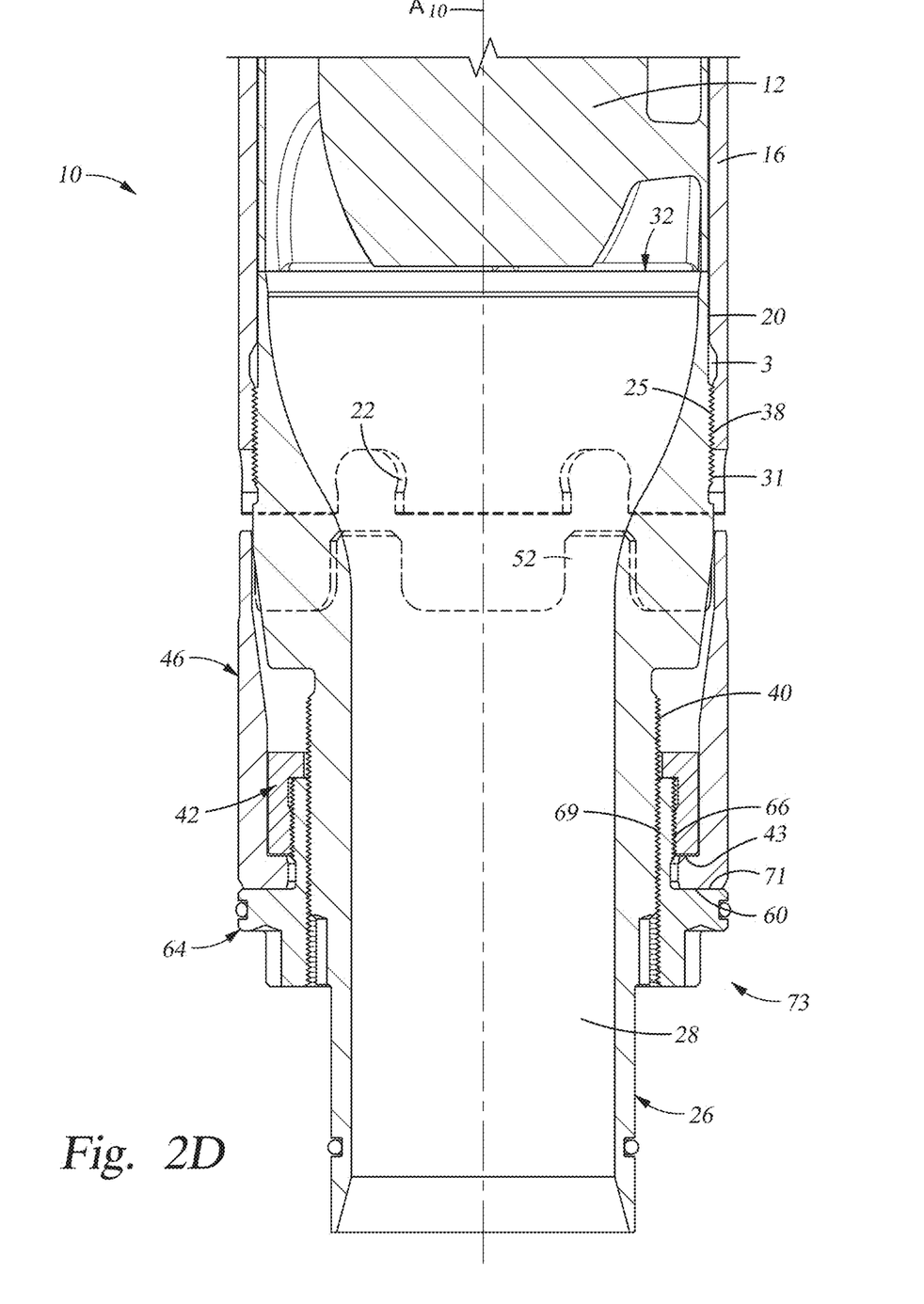

Referring now to FIG. 2C, shown in a side sectional view is a further example step of assembling mounting system 10 in which flow guide 26 is being connected with the inner string component 12 by engaging threads 38 on an outer surface 31 of sidewalls 30 of flow guide 26 with threads 25 on an inner surface 20 of component housing 16. The flow guide 26 is also referred to herein as forward stop element. String component rearward end 9 (FIG. 1B) of inner string component 12 optionally abuts to another string component (not shown) or to a fixed structure within component housing 16, so that inner string component 12 cannot move in a rearward direction and away from forward end 24 of component housing 16 and away from flow guide 26. The another string component or fixed structure within component housing 16 is referred to herein as a rearward stop element. The fixed structure in component housing 16 is represented in FIG. 1B by shoulder 4. Flow guide 26 is threaded into component housing 16 until the shoulder 18 on rearward end 32 of flow guide 26 abuts annular shoulder 5 on forward end 8 of inner string component 12, so that inner string component 12 cannot axially move either in a forward direction or a rearward direction, wherein the forward direction is toward forward end 24 of component housing 16 and toward flow guide 26 and the rearward direction is away from forward end 24 of component housing 16 and away from flow guide 26. An axial tension is applied to the inner string component 12 by the flow guide 26, securing the inner string component 12 axially within the component housing 16 between shoulder 4 in component housing and shoulder 18 on rearward end of flow guide 26. A recess 3 is formed on inner surface 20 of component housing 16. Recess 3 optionally hosts a sliding ring (not shown) that facilitates insertion of flow guide 26 into component housing 16. The sliding ring may be made from PEEK (polyetheretherketon). Shown in a side sectional view in FIG. 2D is a further step of assembly showing the carn assembly 73 placed over the forward end of flow guide 26 with threads 69 on the inner surface 75 of thrust ring 64 in threading engagement with threads 40 on an outer surface 31 of flow guide 26. As shown in dashed outline in FIG. 2D, fingers 52 are in alignment with pockets 22, and when the carn assembly 73 is further urged or screwed axially along the flow guide 26 in the direction of string component 12, fingers 52 will insert into the pockets 22. In an example of alignment between pockets 22 and fingers 52, each pocket 22 and a corresponding finger 52 are each disposed at substantially the same azimuth about longitudinal axis $A_{10}$. In alternatives, contours or parts of the fingers 52 and pockets 22 are engaging, which optionally includes other fasteners such as bolts or fitting keys and the like. The assembly optionally includes nuts or fingers on both sides and a ring with the corresponding contour in the middle. The clearance in gap 81 and the clearance between outer diameter $D_{43}$ of inner ring and inner diameter $D_{48}$ of compression collar 46 allows compression collar 46 to freely rotate as long as frusto-conical surface 34 and frusto-conical surface 58 do not engage. The compression collar 46 can azimuthally be properly oriented, such that fingers 52 align with pockets 22. In a non-limiting example of assembly, aligned fingers 52 enter pockets 22 when compression collar 46 is urged axially in a rearward direction towards the component housing 16 and along the frusto-conical surface 34 on flow guide 26 while thrust ring 64 is threaded onto flow guide 26.

Figure 2E:
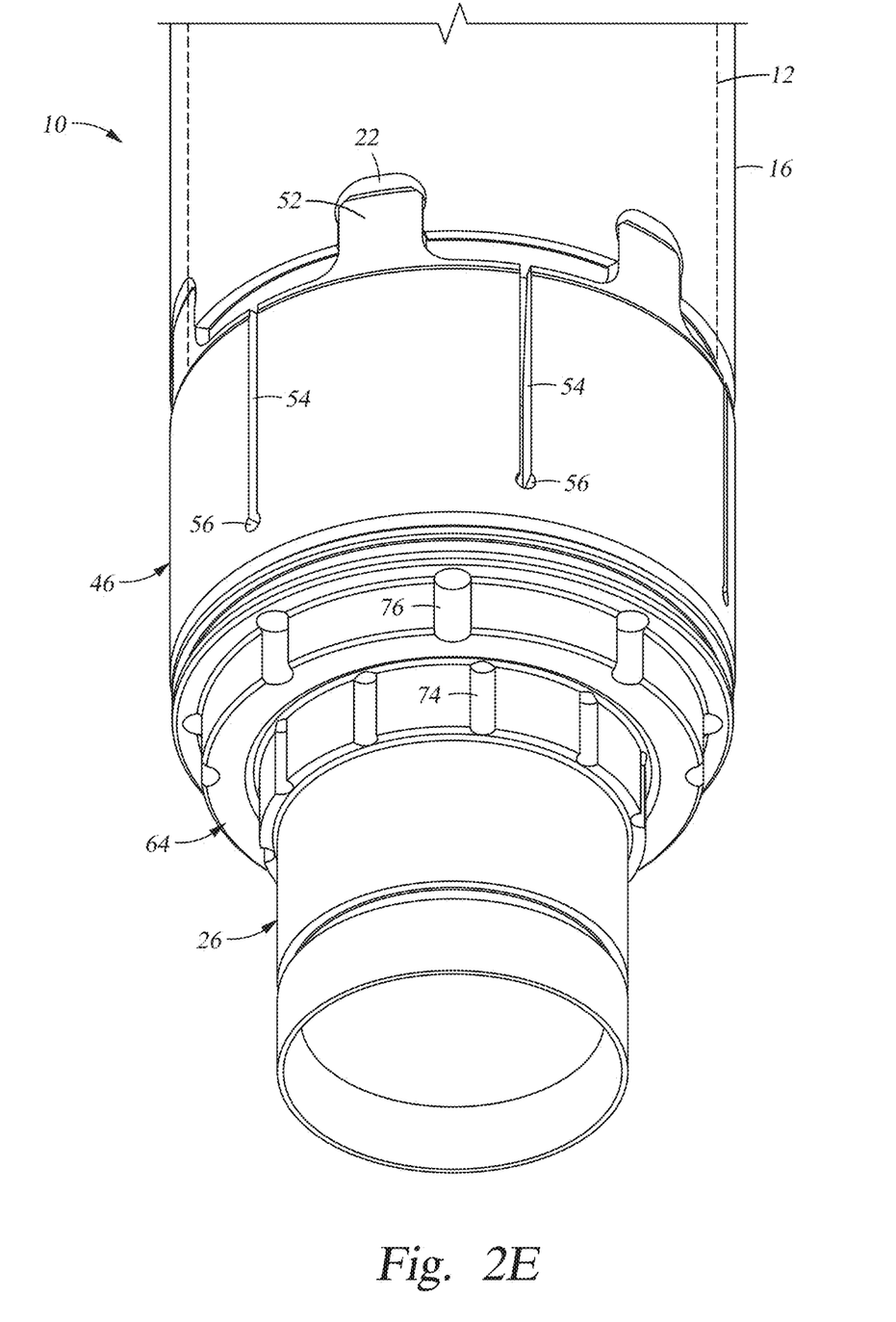
FIG. 2E is a perspective view of an example of the mounting system of FIGS. 1A and 1B that is assembled.

An example of the mounting system 10 with attached inner string component 12 is shown in a perspective view in FIG. 2E. In this example, fingers 52 are shown extending axially and partially within pockets 22, and as described in more detail below, rotationally couple the compression collar 46 with housing 16 and also to the inner string component 12. Further shown in the example of FIG. 2E are profiles 74 which are depressions formed axially along a raised portion of flow guide 26, profiles 74 are selectively engaged by an assembly tool (such as a wrench, not shown) for applying a rotational force onto flow guide, such as when threading flow guide 26 onto component housing 16 (FIG. 2C). Profiles 76 are also shown to form axially forward of ridge 70 of thrust ring 64, and similar to profile 74, profile 76 provide a location for applying a rotational force onto the thrust ring 64, such when threading thrust ring 64 onto flow guide 26 (FIG. 2D) using threads 69 on the thrust ring 64 and threads 40 on the flow guide 26. In alternate embodiments, profiles 74, 76 have different shapes and/or configurations suitable for fitting an assembly tool.

Figure 3A:
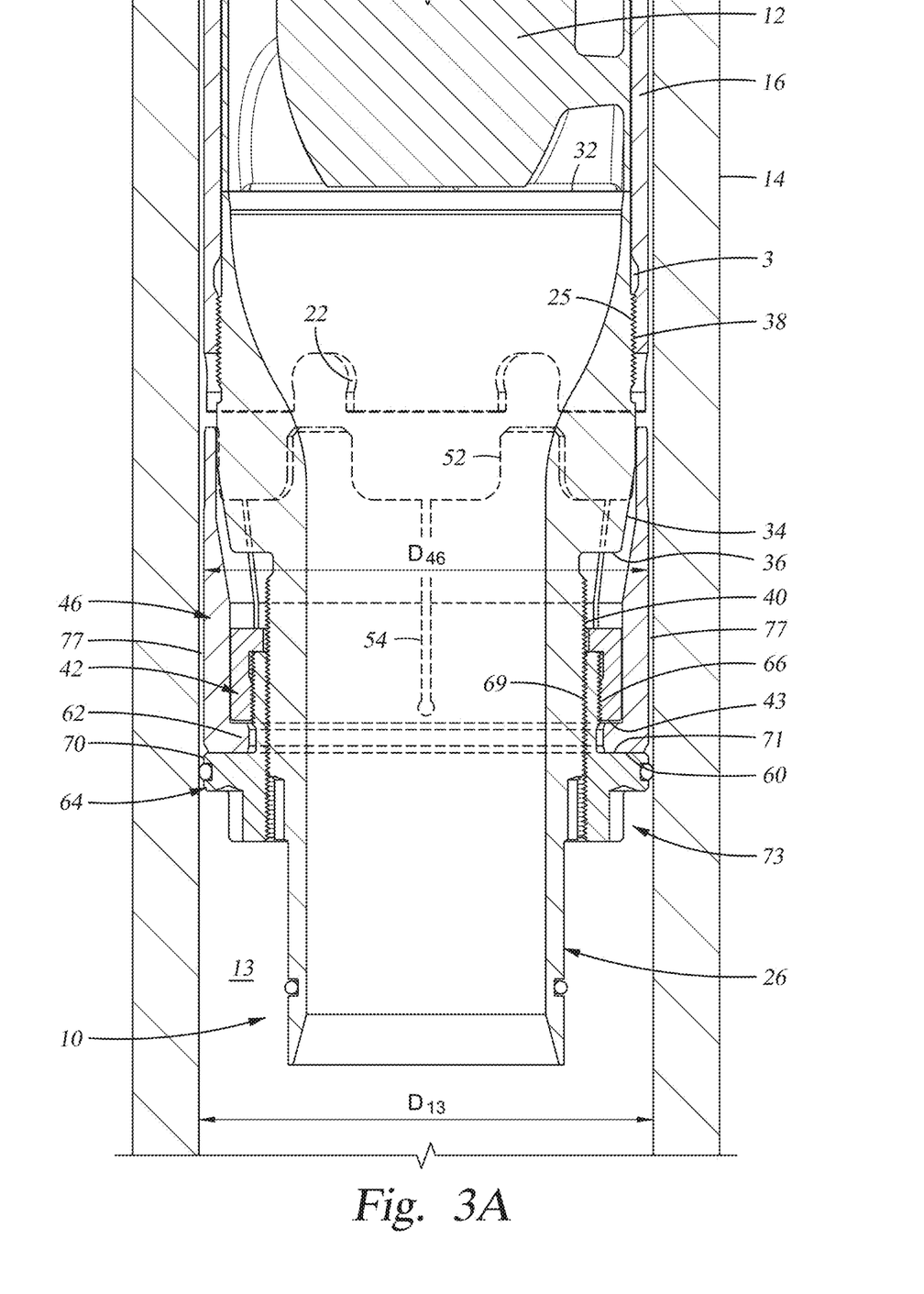
FIGS. 3A and 3B are sectional views of an example of coupling an inner string component in a housing using the mounting system of FIG. 2D.
Figure 3B:
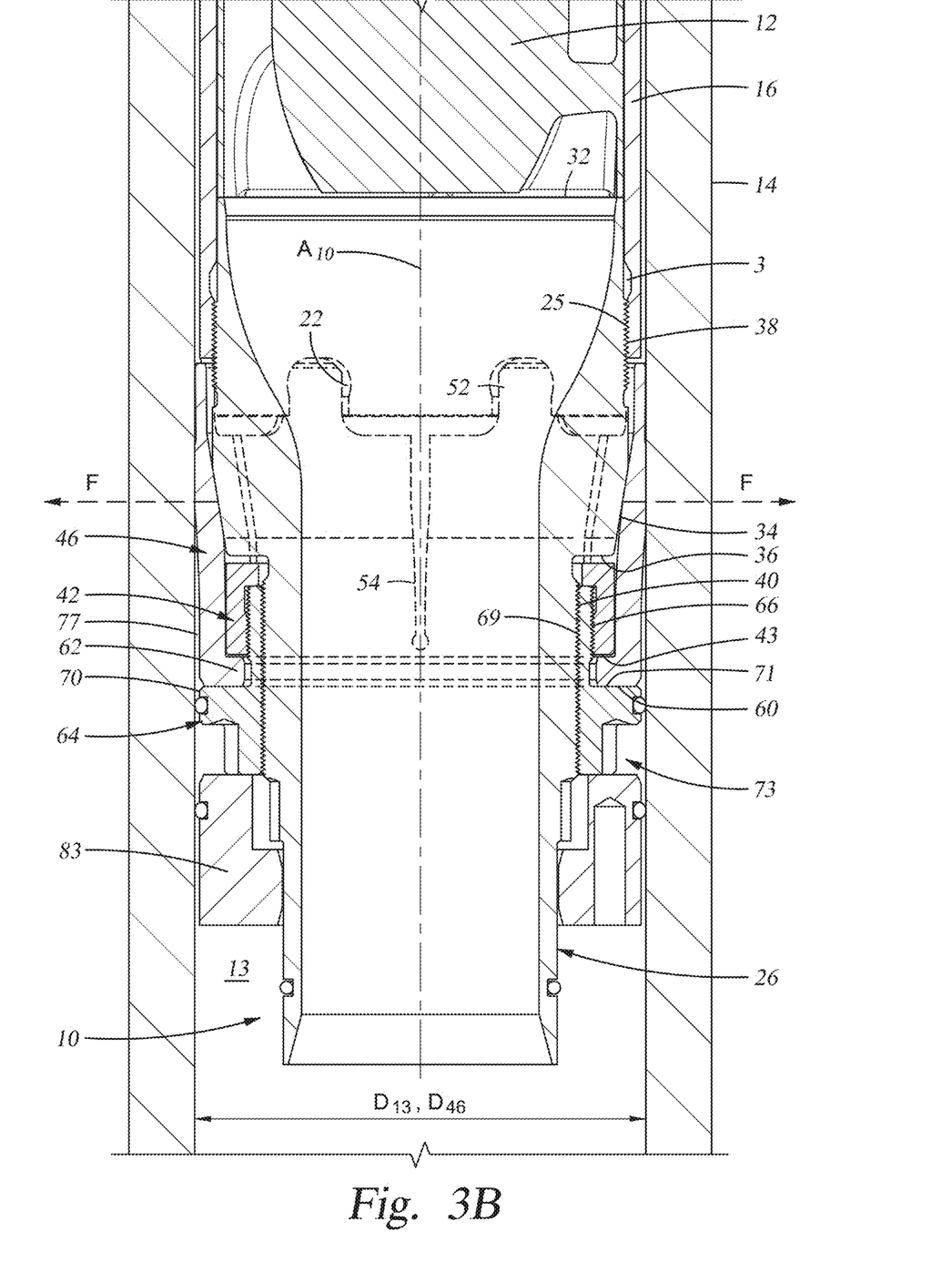

Shown in a side sectional view in FIG. 3A, is the mounting system 10 and attached inner string component 12, after being coupled together, having been inserted into a bore 13 of outer member 14. An inner diameter $D_{13}$ of bore 13 exceeds an outer diameter $D_{46}$ of the compression collar 46 (such as by one to a few $10^{th}$ of a millimeter), and the difference in these diameters creates an annular space 77 between the outer surface 53 of the compression collar 46 and inner surface 15A of sidewalls 17 of outer member 14. Annular space 77 allows easy insertion of mounting system 10 into outer member 14 prior to securing mounting system 10 including inner string component 12 in outer member 14. Illustrated in the example of FIG. 3B is application of a rotational force to thrust ring 64, which rotates thrust ring 64 about longitudinal axis $A_{10}$ engaging threads 69 with threads 40 on an outer surface 31 of the flow guide 26. Engaging threads 69 with threads 40 drives the thrust ring 64 towards the inner string component 12 and component housing 16 causing the shoulder 71 on rearward end of ridge 70 to abut first shoulder 63 on forward end 60 of compression collar 46, which drives compression collar 46 axially along the flow guide 26 towards component housing 16 and brings the frusto-conical surfaces 34, 58 into coaxial sliding contact. As the outer diameter of the frusto-conical portion 37 of the flow guide 26 having the frusto-conical surface 34 increases with distance in a direction towards the rearward end 32 of flow guide 26 and towards component housing 16, and similarly an inner diameter $D_{48}$ of compression collar 46 decreases along the frusto-conical portion 57 with distance along longitudinal axis $A_{10}$ in a direction away from rearward end 50 and towards forward end 60; urging the compression collar 46 rearward and along longitudinal axis $A_{10}$, urges the outer surface 53 of compression collar 46 radially outward towards the inner surface 15A of sidewalls 17 of outer member 14. In an alternative, instead of applying a rotational force to thrust ring 64, mounting is by an axial movement in response to applied forces from hydraulic, threaded fasteners, impacts (e.g., a hammer), and the like.

Referring to the example of FIG. 3B, the compression collar 46 has been moved rearward over the flow guide 26, so that the complementary profiles of the frusto-conical surfaces 34, 58 cause the outer surface 53 (or outer diameter 46) of the compression collar 46 to expand radially outward and into the annular space 77 (FIG. 3A). The slots 54 widen. The expansion of the outer diameter 46 of the compression collar 46 happens elastically. Strategic dimensioning of the surfaces 34, 58 and placement of compression collar 46 over the flow guide 26 causes the outer surface 53 of the compression collar 46 to extend into the annular space 77. Further, continued axial displacement of the compression collar 46 in a rearward direction brings portions of the surfaces 34, 58 into contact with one another, which wedges the compression collar 46 between the flow guide 26 and inner surface 15A of outer member 14 to generate a force F shown radially directed from longitudinal axis $A_{10}$. In the example shown, force F creates a coupling force between the mounting system 10 and outer member 14 that anchors the mounting system 10 and attached component 12 within outer member 14. The coupling force acts normal (perpendicular) to the inner surface 15A of sidewall 17 of outer member 14. Further shown in FIG. 3B is that the fingers 52 are further inserted within pockets 22 and interfere with relative rotation between mounting system 10 and inner string component 12 via the abutting contact (axial tension) of inner string component with flow guide 26. In the example shown, the locking of the threaded connection occurs between flow guide 26 and component housing 16 interferes with rotation of inner string component 12 relative to component housing 16. Mounting system 10 is wedged to outer member 14. While the outer surface of compression collar 46 radially urges outward, the fingers 52 on the compression collar mate with the pockets 22 in the component housing 16. The inner string component 12 is secured axially and rotationally in the outer member 14 by a combination of the coupling force F, the pocket-finger interlock, and the axial tension applied by the flow guide 26 onto the inner string component 12 (FIG. 2C). This way the inner component 12 is restrained from movement due to torsional vibration that may act on the bottom hole assembly. When the inner component 12 is restrained from relative movement to the component housing 16 and outer member 14, the inner component 12 remains fastened to component housing 16 and cannot start to vibrate relative to the component housing 16, which prevents damage to the inner string component 12. In FIG. 3B is shown an optional plug 83, which acts as a filling means. The plug 83 occupies a volume forward of thrust ring 64. This volume is isolated from drilling mud. Keeping the drilling mud out of outer member 14 facilitates removal of the mounting system 10 from the outer member 14. The plug 83 is optionally made from metal or plastic, such as PEEK.

Figure 4:
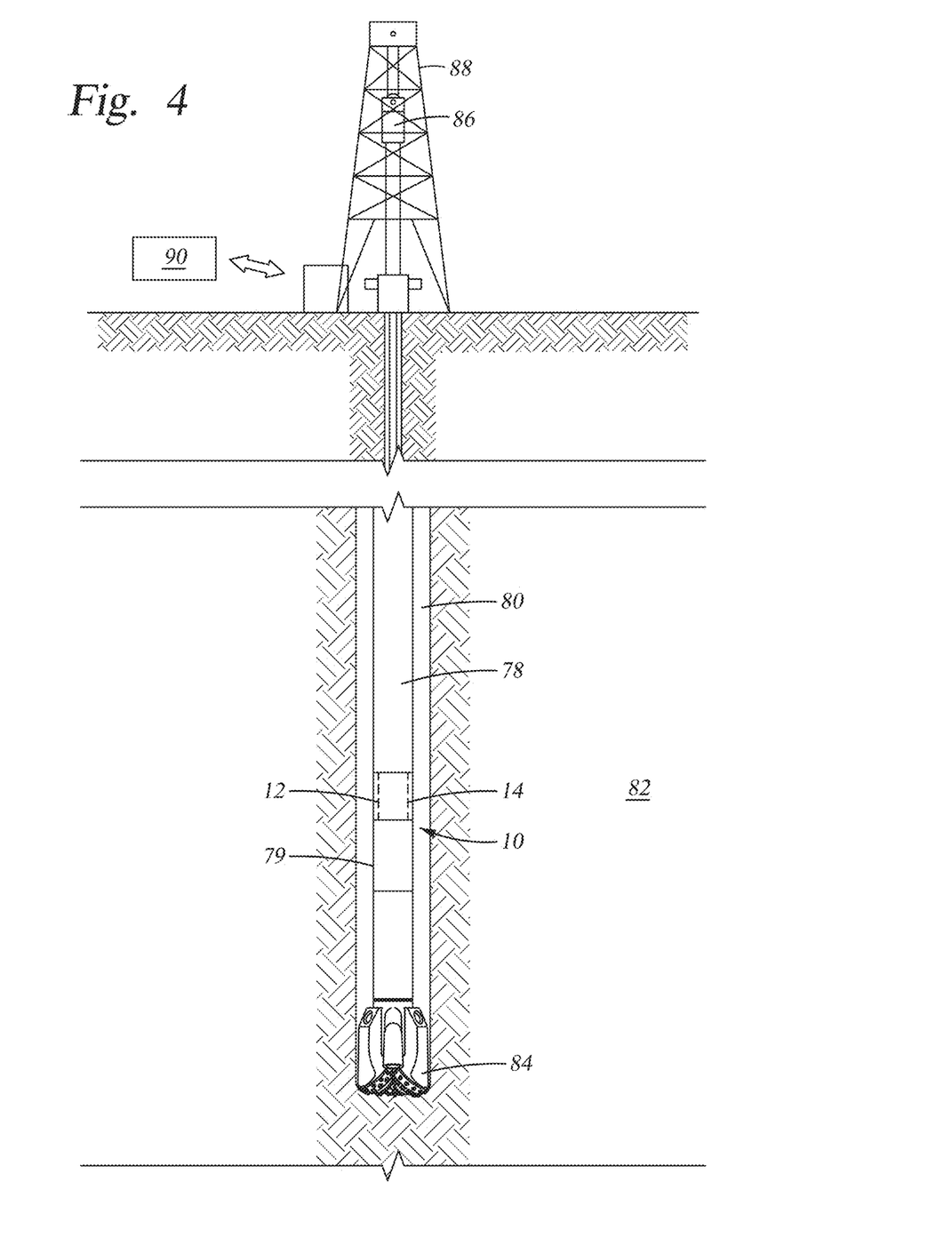
FIG. 4 is a sectional view of an example of forming a wellbore with a drill string having the inner string component and mounting system of FIG. 3B.

Referring now to FIG. 4, shown in a side partial sectional view is an example of mounting system 10 and inner string component 12 coupled together and secured inside of a bore of a drill string 78. In this example the drill string 78 including a BHA 79 is used for forming a wellbore 80 within a formation 82 and a portion of the BHA forms the outer member 14. On a lower end of the BHA 79 is a drill bit 84 that when rotated forms wellbore 80. In a nonlimiting example, a top drive 86 is shown included for providing the rotational force onto drill string 78 and bit 84 for forming wellbore 80. The top drive 86 and drill string 78 are supported on a drilling rig 88 shown mounted on surface above an opening of the wellbore 80. An optional controller 90 is shown for providing operational control for the drilling system. In an alternative, inner string component 12 includes communication means (not shown) that is in communication with controller 90 for communicating information monitored from inside the wellbore 80. In the example shown, torsional oscillations, such as high frequency torsional oscillations ("HFTO"), are imparted onto the drill string 78 in response to the bit 84 interacting with the rock and formation 82. The coupling force F (FIG. 2B) is at a magnitude that exceeds a force or forces imparted onto the string 78 from the HFTO, and successfully retains the mounting system 10 and attached string component 12 in place within the bore of the drill string 78. HFTO have frequencies that are above 50 Hz compared to stick/slip torsional vibrations that typically have frequencies below 1 Hz. Mounting system 10 allows flowless operation of inner string component in the drill string 78 and/or BHA 79 while drilling the wellbore 80.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A mounting system to secure a component in a tubular housing comprising:
    an outer collar having a longitudinal axis and an inner surface;
    a tubular housing, at least partially inside the outer collar, includes at least one of a pocket and a finger at an axial end of the tubular housing along the longitudinal axis;
    a component in the tubular housing, the component includes an axial end along the longitudinal axis;
    a stop element, at least partially in the tubular housing and at least partially in the outer collar, the stop element fastened to the tubular housing by a first fastening means, an axial end of the stop element abuts the axial end of the component, the stop element includes a conical surface on an outer surface along the longitudinal axis;
    a compression element between the stop element and the outer collar, the compression element includes at least one of a finger and a pocket on a first axial end and includes a first shoulder on a second axial end along the longitudinal axis and opposite the first axial end;
    a thrust ring surrounding the stop element and fastened to the stop element by a second fastening means, the thrust ring includes a second shoulder, the second shoulder abutting the first shoulder on the compression element;
    wherein the compression element applies a coupling force onto the inner surface of the outer collar and (i) the finger on the compression element reaches into the pocket on the tubular housing or (ii) the finger on the tubular housing reaches into the pocket on the compression element, and securing the component axially and rotationally in the outer collar.

2. The mounting system of claim 1, wherein the stop element includes an outer diameter, the outer diameter varies along the conical surface and along the longitudinal axis, the conical surface includes a first axial end and a second axial end, and wherein the outer diameter at the first axial end is larger than at the second axial end, and the first axial end is closer to the component than the second axial end.

3. The mounting system of claim 1, wherein the compression element includes a conical surface on an inner surface along the longitudinal axis, and the conical surface on the compression element corresponds with the conical surface on the stop element.

4. The mounting system of claim 1, wherein the first fastening means includes first threads on an inner surface of the tubular housing, and second threads on an outer surface of the stop element.

5. The mounting system of claim 4, wherein the second fastening means includes third threads on an outer surface of the stop element and fourth threads on an inner surface of the thrust ring.

6. The mounting system of claim 1, further including an inner ring surrounding the thrust ring, the inner ring is surrounded by the compression element, the inner ring is fastened to the thrust ring by a third fastening means.

7. The mounting system of claim 6, wherein the inner ring includes a third shoulder, and the compression element includes a lip, wherein the lip is between the second shoulder and the third shoulder.

8. The mounting system of claim 7, wherein the lip includes an axial extension along the longitudinal axis, and wherein the axial extension of the lip is smaller than the axial distance between the second shoulder and the third shoulder.

9. The mounting system of claim 1, wherein the compression element includes one of (i) a sidewall surrounding the thrust ring and includes slots extending axially along a portion of the sidewall along the longitudinal axis, and (ii) a plurality of separate compression segments located around the thrust ring and wherein each of the plurality of compression segments includes the conical surface.

10. The mounting system of claim 1, wherein the coupling force exceeds forces from high frequency torsional oscillations that are imparted onto the outer collar.

11. The mounting system of claim 1, wherein the stop element includes a central bore with an inner diameter.

12. A method of coupling a component within a tubular housing comprising:
obtaining a stop element comprising a conically profiled outer surface, a portion coupled with the component, the component surrounded by a tubular housing with at least one of a pocket and finger extending along a longitudinal axis of the tubular housing;
the stop element coupled with the tubular housing,
obtaining a compression element having at least one of a finger and pocket extending along a longitudinal axis of the compression element;
disposing the stop element, the tubular housing, and the component inside an outer collar, the outer collar having an inner surface;
sliding the compression element into an annular space between the conically profiled outer surface of the stop element and the inner surface of the outer collar, so that the compression element is radially compressed between the stop element and the outer collar and creates a force that axially and rotationally couples the stop element, the tubular housing and the component to the outer collar; and
aligning the at least one of the pocket and finger on the tubular housing with the at least one of the finger and pocket on the compression element so that the finger inserts into the pocket as the compression element slides into the annular space.

13. The method of claim 12, wherein a conical profile is formed on an inner surface of the compression element that is complementary to and in selective sliding engagement with the conically profiled outer surface on the stop element.

14. The method of claim 12, wherein slots are formed axially along a length of the compression element, the slots expanding when the compression element slides over the conically profiled outer surface of the stop element.

15. The method of claim 12, further comprising obtaining a thrust ring having threads on an inner surface, and engaging the threads on the inner surface with threads on an outer surface of the stop element to create a force for sliding the compression element along the stop element.

16. The method of claim 15, further comprising rotating the compression element about the stop element to orient the at least one of the finger and pocket on the compression element with the at least one of the pocket and finger on the tubular housing.

17. The method of claim 12, wherein the outer collar comprises a section of a drill string and the force that axially and rotationally couples the stop element to the outer collar exceeds forces from high frequency torsional oscillations that are imparted onto the drill string during drilling.

18. The method of claim 12, further including coupling a thrust ring to the stop element and using the thrust ring to sliding the compression element into the annular space between the conically profiled outer surface of the stop element and the inner surface of the outer collar.

19. The method of claim 18, further including coupling an inner ring to the thrust ring, wherein at least a portion of the compression element is located between the inner ring and the thrust ring and using the inner ring when removing the compression element from the stop element during uncoupling the component and the tubular housing.

20. The method of claim 12, wherein the component is a mud motor or a turbine.

* * * * *